United States Patent
Hong (10) Patent No.: US 10,904,975 B1
(45) Date of Patent: Jan. 26, 2021

(54) DIMMING FOR OPEN-LOOP RESONATE CONVERTERS

(71) Applicant: Infineon Technologies Austria AG, Villach (AT)

(72) Inventor: Shi-Heng Hong, New Taipei (TW)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/596,983

(22) Filed: Oct. 9, 2019

(51) Int. Cl.
  *H05B 39/00* (2006.01)
  *H05B 41/16* (2006.01)
  *H05B 45/37* (2020.01)
  *H02M 3/335* (2006.01)
  *H05B 45/10* (2020.01)

(52) U.S. Cl.
  CPC ........ *H05B 45/37* (2020.01); *H02M 3/33569* (2013.01); *H05B 45/10* (2020.01)

(58) Field of Classification Search
  CPC .... B23K 9/0738; B23K 9/0735; B23K 9/091; F02P 15/003; F02P 1/086; F02P 3/0435; F02P 3/0552; F02P 3/01; F02P 3/0884; H05B 41/2325; H05B 41/2822; H05B 41/28; H05B 41/295; H05B 41/2827; H05B 41/3925; H05B 41/44; H05B 41/3927; H05B 41/2821; H05B 41/04; H05B 41/2881; H05B 41/391; H05B 41/392; H05B 33/0815; H05B 33/0818; H05B 41/2828; H05B 41/3921; H05B 37/029; H05B 33/0803; H05B 37/0254; H05B 37/02; Y02B 20/202; Y02B 20/204; H01J 61/56; G05F 1/32; G05F 1/34
  See application file for complete search history.

(56) References Cited

U.S. PATENT DOCUMENTS

| | | | | |
|---|---|---|---|---|
| 5,930,121 A | * | 7/1999 | Henry | H05B 41/3927 315/307 |
| 2014/0312789 A1 | * | 10/2014 | Feng | H05B 45/39 315/186 |
| 2015/0138841 A1 | * | 5/2015 | Pahlevaninezhad | H02J 3/383 363/17 |
| 2017/0187292 A1 | * | 6/2017 | Schaemann | G01R 23/02 |
| 2017/0264206 A1 | * | 9/2017 | Rana | H02M 3/33569 |

* cited by examiner

*Primary Examiner* — Minh D A
(74) *Attorney, Agent, or Firm* — Murphy, Bilak & Homiller, PLLC (57) ABSTRACT

An open-loop resonate converter includes: a transformer having a first winding on a primary side of the open-loop resonate converter and a second winding on a secondary side of the open-loop resonate converter; a resonant tank coupled to the first winding of the transformer and configured, at a first fixed frequency, to provide a constant LED current over a voltage range at the secondary side without feedback from the secondary side; and a circuit configured to modulate switching of the resonant tank between the first fixed frequency and a second fixed frequency higher than the first fixed frequency based on a dimming control signal input to the circuit, such that the resonant tank is switched at the first fixed frequency for longer durations when the dimming control signal indicates less dimming and for shorter durations when the dimming control signal indicates more dimming.

18 Claims, 7 Drawing Sheets

DIMMING FOR OPEN-LOOP RESONATE CONVERTERS

BACKGROUND

Resonate converters are widely used in middle power LED (light emitting diode) driver applications. For example, LCC converters can achieve wider voltage operation with smaller frequency variation. Moreover, constant LED current may be achieved in constant frequency operation over the rated output voltage range. Thus, LED driver circuits can be further simplified without a feedback circuit.

However, many LED applications require dimming. With PWM-based dimming, the controller of the resonate converter receives a PWM (pulse width modulation) signal normally in the frequency range of 200 Hz-2 kHz from the dimming side and PWM stage switching follows the time sequence of the dimming signal. The percentage of 'ON' and 'OFF' state determines luminance. However, there are limitations associated with implementing PWM-based dimming.

Not all LED controllers are equipped with the PWM dimming feature. If such a controller is forced to enter burst mode to achieve PWM dimming-like behavior, the blanking time during mode transient must be considered. This blanking time limits the voltage range operating window, especially at extremely light dimming levels, and also affects dimming accuracy. Moreover, LED controllers are typically powered by an auxiliary winding of a transformer included in the resonate converter. However, the controller is not easily supplied from the auxiliary winding at extremely low dimming conditions due to longer 'OFF' periods.

Hence, there is a need for improved dimming control in open-loop resonate converters.

SUMMARY

According to an embodiment of an open-loop resonate converter, the open-loop resonate converter comprises: a transformer having a first winding on a primary side of the open-loop resonate converter and a second winding on a secondary side of the open-loop resonate converter; a resonant tank coupled to the first winding of the transformer and configured, at a first fixed frequency, to provide a constant LED current over a voltage range at the secondary side without feedback from the secondary side; and a circuit configured to modulate switching of the resonant tank between the first fixed frequency and a second fixed frequency higher than the first fixed frequency based on a dimming control signal input to the circuit, such that the resonant tank is switched at the first fixed frequency for longer durations when the dimming control signal indicates less dimming and for shorter durations when the dimming control signal indicates more dimming.

According to an embodiment, the circuit is a voltage controlled oscillator (VCO) controller configured to switch the resonant tank at the first fixed frequency or the second fixed frequency at a variable duty cycle, and the VCO controller is configured to change the duty cycle based on a voltage level of a dimming control signal input to a frequency control pin of the VCO controller.

According to another embodiment, the circuit is a current controlled oscillator (CCO) controller configured to switch the resonant tank at the first fixed frequency or the second fixed frequency at a variable duty cycle, and the CCO controller is configured to change the duty cycle based on a current level of a dimming control signal input to a frequency control pin of the CCO controller.

Separately or in combination, the open-loop resonate converter further comprises a coupler configured to convert a PWM (pulse width modulation) signal at the secondary side and which indicates a degree of dimming to a current on the primary side and which is input as the dimming control signal to the frequency control pin of the VCO/CCO controller.

Separately or in combination, the resonant tank is configured to transfer energy to the secondary side when switched at the second fixed frequency but not to provide a constant LED current over the voltage range.

Separately or in combination, the circuit of the open-loop resonate converter is a controller powered by an auxiliary winding of the transformer, and the resonant tank is configured to maintain a minimum voltage at the auxiliary winding for powering the controller when switching at the second fixed frequency.

Separately or in combination, the resonant tank is configured to maintain a minimum voltage across an auxiliary winding of the transformer when switching at the second fixed frequency.

Separately or in combination, the resonant tank is an LLC tank.

Separately or in combination, the dimming control signal is a pulse width modulation (PWM) signal, the circuit is configured to switch the resonant tank at the first fixed frequency or the second fixed frequency at a variable duty cycle, and the circuit is configured to change the duty cycle based on the level of the PWM signal.

According to an embodiment of a method of controlling an open-loop resonate converter having a transformer with a first winding on a primary side of the open-loop resonate converter and a second winding on a secondary side of the open-loop resonate converter, and a resonant tank coupled to the first winding of the transformer and configured, at a first fixed frequency, to provide a constant LED current over a voltage range at the secondary side without feedback from the secondary side, the method comprises: receiving a dimming control signal which indicates a degree of LED dimming; and switching the resonant tank between the first fixed frequency and a second fixed frequency higher than the first fixed frequency based on the dimming control signal, such that the resonant tank is switched at the first fixed frequency for longer durations when the dimming control signal indicates less dimming and for shorter durations when the dimming control signal indicates more dimming.

According to an embodiment, the dimming control signal is input to a frequency control pin of a voltage controlled oscillator (VCO) controller configured to switch the resonant tank at the first fixed frequency or the second fixed frequency at a variable duty cycle, and switching the resonant tank between the first fixed frequency and the second fixed frequency comprises changing the duty cycle of the VCO controller based on a voltage level of the dimming control signal.

According to another embodiment, the dimming control signal is input to a frequency control pin of a current controlled oscillator (CCO) controller configured to switch the resonant tank at the first fixed frequency or the second fixed frequency at a variable duty cycle, and switching the resonant tank between the first fixed frequency and the second fixed frequency comprises changing the duty cycle of the CCO controller based on a current level of the dimming control signal.

Separately or in combination, receiving the dimming control signal comprises converting a PWM (pulse width modulation) signal at the secondary side and which indicates a degree of dimming to a current on the primary side and which is input as the dimming control signal to the frequency control pin of the VCO/CCO controller.

Separately or in combination, the method further comprises: powering a controller of the open-loop resonate converter by an auxiliary winding of the transformer; and maintaining a minimum voltage at the auxiliary winding for powering the controller by switching the resonant tank at the second fixed frequency.

Separately or in combination, receiving the dimming control signal comprises receiving a pulse width modulation (PWM) signal, and switching the resonant tank between the first fixed frequency and the second fixed frequency based on the dimming control signal comprises switching the resonant tank at the first fixed frequency or the second fixed frequency at a variable duty cycle and changing the duty cycle based on the level of the PWM signal.

According to an embodiment of a controller for an open-loop resonate converter, the controller comprises: a frequency control pin; and an oscillator circuit configured to oscillate between a first fixed frequency and a second fixed frequency at a duty cycle based on a voltage level or a current level of an LED dimming control signal received at the frequency control pin, such that the oscillator circuit oscillates at the first fixed frequency for longer durations when the LED dimming control signal indicates less dimming and for shorter durations when the LED dimming control signal indicates more dimming.

According to an embodiment, the oscillator circuit is a voltage controlled oscillator (VCO) controller configured to oscillate at the first fixed frequency or the second fixed frequency at a variable duty cycle, and the VCO controller is configured to change the duty cycle based on a voltage level of the LED dimming control signal input to the frequency control pin.

According to another embodiment, the oscillator circuit is a current controlled oscillator (CCO) controller configured to oscillate at the first fixed frequency or the second fixed frequency at a variable duty cycle, and the CCO controller is configured to change the duty cycle based on a current level of the LED dimming control signal input to the frequency control pin of the VCO controller.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein provide an open-loop resonate converter, controller and related method for implementing PFM (pulse frequency modulation) dimming for LED applications. The PFM-based dimming techniques described herein allow rapid changes of the open-loop resonate converter switching frequency, and the resulting LED current is similar as in PWM dimming. In addition, the PFM-based dimming techniques described herein transfer adequate energy during periods of high dimming to ensure the resonate converter controller is adequately powered even under high dimming conditions.

Figure 1:
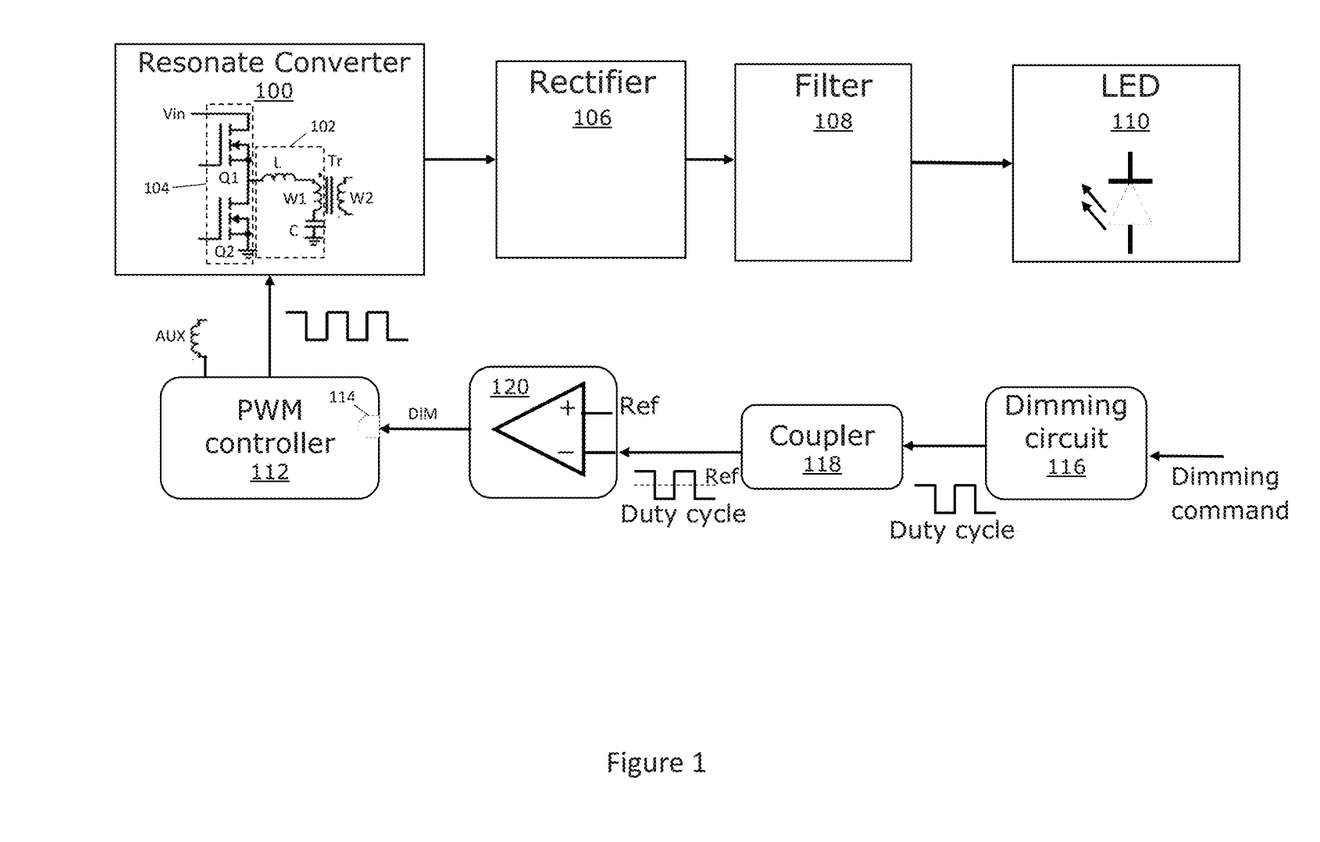
FIG. 1 illustrates a block diagram of an embodiment of an open-loop resonate converter which implements PFM-based dimming for LED applications.

FIG. 1 illustrates an embodiment of an open-loop resonate converter 100 which implements PFM-based dimming for LED applications. The open-loop resonate converter 100 includes a transformer Tr having a first winding W1 on the primary side of the open-loop resonate converter 100 and a second winding W2 on the secondary side of the open-loop resonate converter 100. The open-loop resonate converter 100 also includes a resonant tank 102 coupled to the first winding W1 of the transformer Tr. In one embodiment, the resonant tank 102 is an LLC resonant tank formed by an inductor L, the first winding W1 of the transformer T2 and a capacitor C. According to this embodiment, the open-loop resonate converter 100 is an LLC converter that inverts the DC input voltage Vin into a square wave by a switch network 104 which switches the resonant tank 102.

Switch devices Q1, Q2 of the switch network 104 are illustrated as n-channel MOSFETs, but it should be understood that other types of switch devices may be used, e.g., p-channel MOSFETs, junction field-effect transistors (JFETs), insulated-gate bipolar transistors (IGBTs), bipolar junction transistors (BJTs), high-electron mobility transistors (HEMTs), etc. The switch network 104, which may be arranged as a half-bridge as shown in FIG. 1 or as a full-bridge, feeds the resonant LLC tank 102. The resonant LLC tank 102 filters harmonics to provide a sinusoidal-like voltage and current waveform which in turn feeds the transformer Tr. The transformer Tr provides voltage scaling and primary-secondary isolation. The converter power flow may be controlled by modulating the square wave frequency with respect to the resonance of the LLC resonant tank 102, via the switch network 104. In general, any type of resonant tank may be used. For example, the resonant tank 102 instead may be an LCC resonant tank, a switched capacitor resonant tank, etc.

In each case, the resonant tank 102 is configured to provide a constant LED current over a defined voltage range at the secondary side of the open-loop resonate converter 100 without feedback from the secondary side when switched at a first fixed frequency Fsw1 by the switch network 104. A rectifier circuit 106 such as a diode rectifier, active bridge rectifier, etc. and a filter 108 convert the voltage across the second winding W2 of the transformer Tr to a constant LED current for an LED load 110. The first fixed frequency Fsw1 corresponds to the resonance of the resonant tank 102. In one embodiment, the inductance and capacitance of the reactive components of the resonant tank 102 are selected such that a constant LED current is provided to the LED load 110 over a voltage range of about 20V to 80V when the resonant tank 102 is switched by the switch network 104 at the first fixed frequency Fsw1. The resonant tank 102 may provide a constant LED current to the LED load 110 over a voltage range different than 20V to 80V, depending on the type of LED load 110 and LED application. The LED load 110 may include a battery system or a current drive system which is activated when the output voltage of the open-loop resonate converter 100 is higher than a certain voltage.

The open-loop resonate converter 100 also includes a circuit 112 for modulating the switching of the resonant tank 102, via the switch network 104, between the first fixed frequency Fsw1 and a second fixed frequency Fsw2 higher than the first fixed frequency Fsw1. The circuit 112 modulates switching of the resonant tank 102 between Fsw1 and Fsw2 based on a dimming control signal 'DIM' input to the circuit 112 and which indicates the level of dimming desired at the LED load 110. The resonant tank 102 is switched at the first fixed frequency Fsw1 for longer durations when the dimming control signal DIM indicates less dimming at the LED load 110 and for shorter durations when the dimming control signal indicates more dimming at the LED load 110.

Accordingly, the circuit 112 implements PFM modulation based on the dimming control signal DIM. In one embodiment, the dimming control signal DIM is a PWM signal and the circuit 112 is a PWM controller. According to this embodiment, the circuit 112 switches the resonant tank 102, via the switch network 104, at the first fixed frequency Fsw1 or the second fixed frequency Fsw2 at a variable duty cycle and changes the duty cycle based on the level of the PWM signal. This way, PFM may be used to emulate PWM dimming without the need for a separate PWM dimming pin in the PWM controller 112.

For example, the circuit 112 may be a voltage controlled oscillator (VCO) controller that changes the duty cycle at which the resonant tank 102 is switched, via the switch network 104, at the first fixed frequency Fsw1 or the second fixed frequency Fsw2 based on the voltage level of the dimming control signal DIM input to a frequency control pin 114 of the VCO controller 112. In another example, the circuit 112 may be a current controlled oscillator (CCO) controller that changes the duty cycle at which the resonant tank 102 is switched, via the switch network 104, at the first fixed frequency Fsw1 or the second fixed frequency Fsw2 based on the current level of the dimming control signal DIM input to the frequency control pin 114 of the CCO controller 112. The applied voltage/current at the frequency control pin 114 determines the instantaneous oscillation frequency of the VCO/CCO controller 112.

The VCO/CCO controller 112 converts the dimming control signal DIM received at the frequency control pin 114 into a PFM dimming control signal applied to the switch network 104. The duty cycle of the PFM dimming control signal applied to the switch network 104 corresponds to the amount of dimming desired at the LED load 110. In the case of a PWM signal, the dimming control DIM signal received at the frequency control pin 114 of the VCO/CCO controller 112 changes the frequency control between the first (lower) fixed frequency Fsw1 and the second (higher) fixed frequency Fsw2 based on the duty cycle of the signal DIM.

The duty cycle information may be extracted from a dimming command by a dimming circuit 116. The dimming circuit 116, e.g., a resistor, etc., may transfer an analog to digital signal or just bypass/forward the digital signal with the duty cycle information to a coupler 118 such as an optocoupler, magnetic coupler, etc. In one embodiment, the signal output by the dimming circuit 116 is a PWM signal which indicates the desired degree of dimming at the LED load 110. PFM is implemented by controlling the current of the coupler 118 based on the PWM signal output by the dimming circuit 116. The two fixed frequencies Fsw1, Fsw2 vary with different coupler current states, and changes in the duty cycle of the PWM signal output by the dimming circuit 116 determines the output current of the coupler 118. There are two coupler states in PFM dimming: (1) current in the coupler 118 which corresponds to high frequency operation; and (2) no current in the coupler 118 which corresponds to constant current mode. The output of the coupler 118 is compared to a reference 'Ref' by a comparator circuit 120. The output of the comparator circuit 120 is the dimming control signal DIM received at the frequency control pin 114 of the VCO/CCO controller 112 and may be a PWM signal in some embodiments. Accordingly, PFM may be applied to the VCO/CCO controller 112 by changing the voltage/current level of the dimming control signal DIM received at the frequency control pin 114 of the VCO/CCO controller 112.

Figure 2:
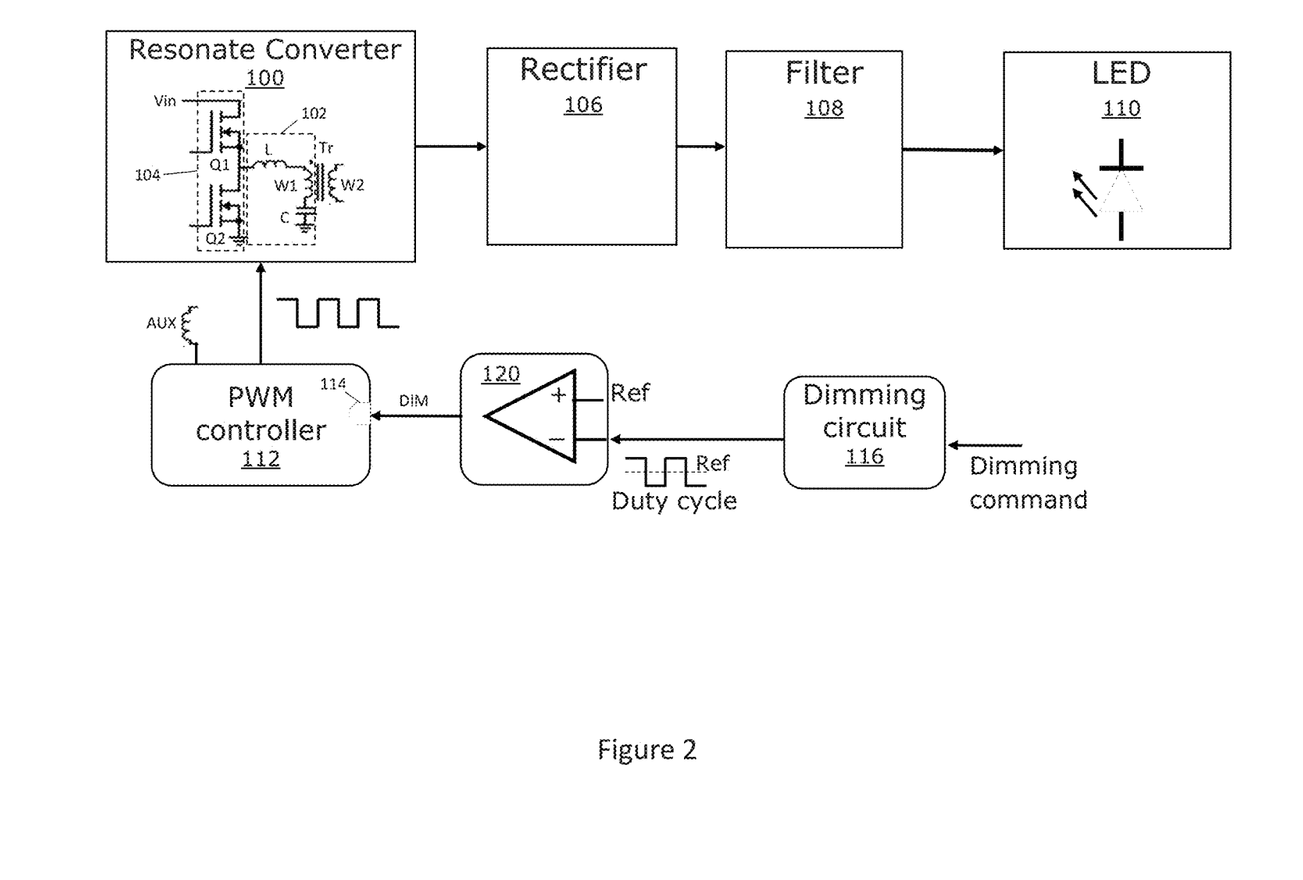
FIG. 2 illustrates a block diagram of another embodiment of an open-loop resonate converter which implements PFM-based dimming for LED applications.

FIG. 2 illustrates another embodiment of the open-loop resonate converter 100 which implements PFM-based dimming for LED applications. The embodiment shown in FIG. 2 is similar to the embodiment illustrated in FIG. 1. Different, however, the coupler 118 is omitted in FIG. 2.

Figure 3:
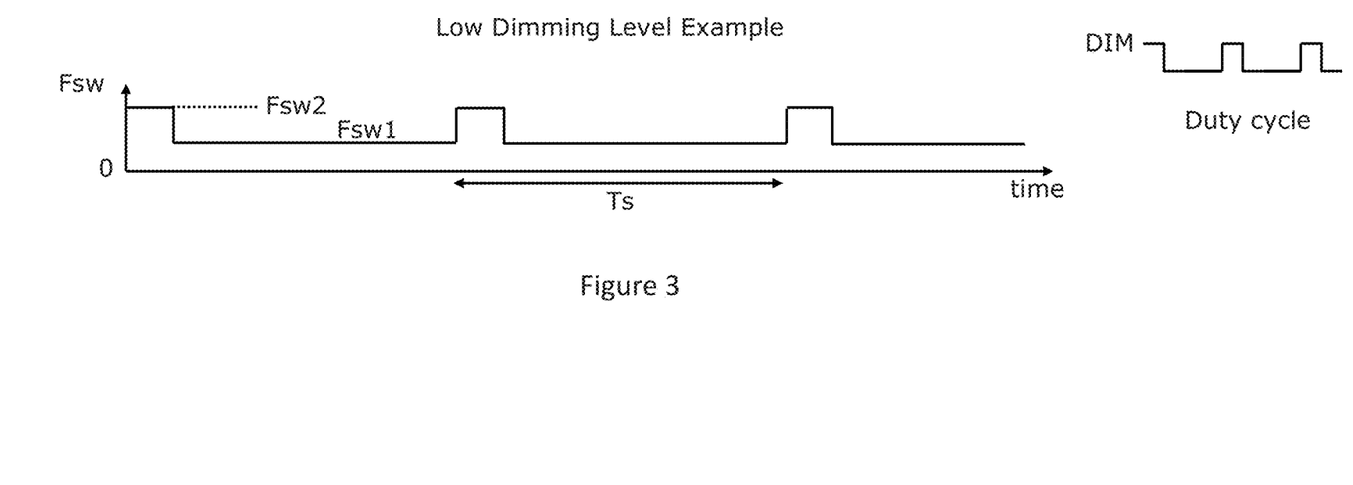
FIGS. 3 and 4 illustrate two different LED dimming scenarios implemented by the open-loop resonate converter shown in FIGS. 1 and 2.
Figure 4:
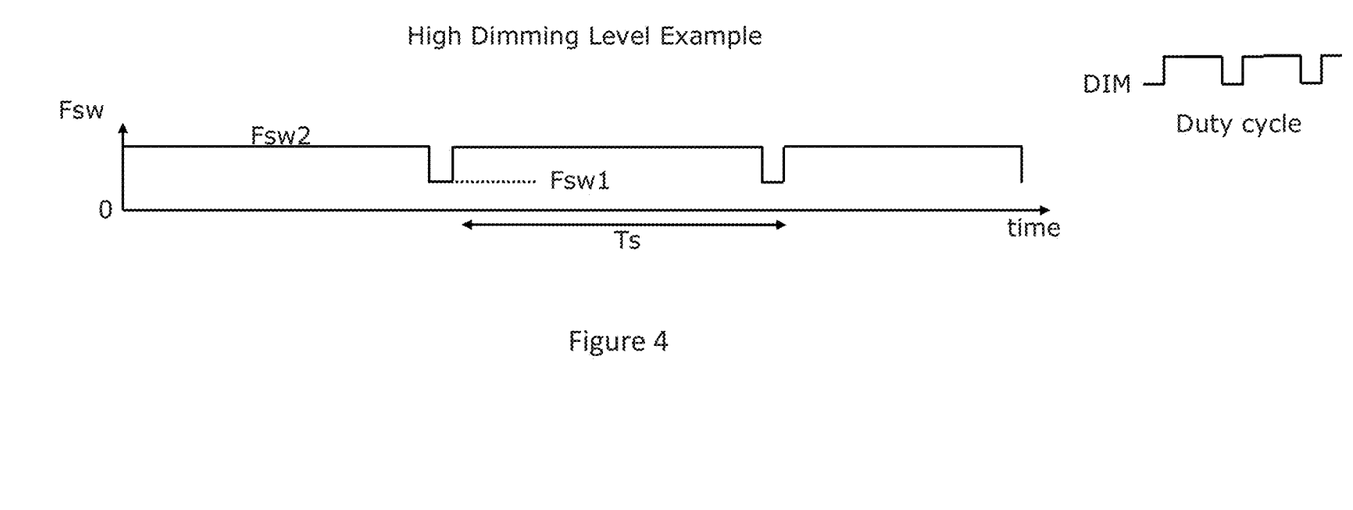

FIGS. 3 and 4 illustrate two different PFM scenarios implemented by the open-loop resonate converter 100 shown in FIGS. 1 and 2, for two different LED dimming levels. In FIG. 3, less dimming is implemented (e.g. about 15% dimming). In FIG. 4, more dimming is implemented (e.g. about 85% dimming).

Variable dimming is implemented by adjusting the duty cycle of the dimming control signal 'DIM' input to the control circuit 112 of the open-loop resonate converter 100. FIG. 3 shows that less dimming may be implemented by maintaining the switching frequency of the resonant tank 102 at the first fixed switching frequency Fsw1 for a longer duration than at the second fixed switching frequency Fsw2 over a switching period Ts of the switch network 104. FIG. 4 shows that for the same switching period Ts, more dimming may be implemented by maintaining the switching frequency of the resonant tank 102 at the second fixed switching frequency Fsw2 for a longer duration than at the first fixed switching frequency Fsw1. As explained above, such PFM control may be implemented by adjusting the duty cycle of the dimming control signal 'DIM' accordingly. The duty cycle of the dimming control signal DIM may determine the duration of Fsw1 or the duration of Fsw2 each switching period Ts, depending on the configuration of the control circuit 112 in the case of VCO or CCO control. That is, if the dimming control signal DIM is a PWM signal, the received PWM signal is 'high' to indicate the first/second fixed frequency Fsw1/Fsw and 'low' to indicate the second/first fixed frequency Fsw2/Fsw1, which is like PFM duty control dimming.

The control circuit 112 of the open-loop resonate converter 100 switches between the two fixed frequencies Fsw1, Fsw2 to ensure an adequate voltage level is provided at an auxiliary winding AUX of the transformer Tr. The control circuit 112, e.g., in the case of a primary or secondary side controller, may be powered by the auxiliary winding AUX of the transformer Tr. According to this embodiment, the resonant tank 102 is configured and the second fixed switching frequency Fsw2 is selected to maintain a minimum voltage V_min at the auxiliary winding AUX for powering the controller 112 when switching the resonant tank 102 at the second fixed frequency Fsw2. For high dimming levels such as 95% dimming up to 99% dimming, very little active switching occurs in conventional PWM dimming. To the contrary, the embodiments described herein provide continued switching under all dimming conditions, but with PFM control between Fsw1 and Fsw2 based on the duty cycle of the dimming control signal DIM input to the controller 112 of the open-loop resonate converter 100.

The higher fixed frequency Fsw2 provides enough energy transfer to maintain a minimum voltage V_min at the auxiliary winding AUX of the transformer Tr so that the controller 112 is adequately powered even under very high dimming conditions such as 95% dimming or more, but does not provide a constant LED current over the defined voltage range. That is, the resonant tank 102 is configured to provide a constant LED current over a defined voltage range without feedback from the secondary side when switched at the first fixed frequency Fsw1 by the switch network 104, but does not provide a constant LED current over the defined voltage range when switched at the second fixed frequency Fsw2 by the switch network 104. For purely illustrative purposes, an LCC network may be designed to provide a constant LED current of about 1.6 A over a defined voltage range of about 20V to 80V when switched at 40 kHz, does not provide a constant LED current over the 20V to 80V range when switched at 80 kHz, but does maintain a sufficient voltage at the auxiliary winding AUX of the transformer Tr for powering the controller 112 when switched at 80 kHz. These parameters are given merely as an example and should not be considered limiting in any way.

The values of Fsw1 and Fsw2 depend on the type of resonant tank 102, the values of the reactive components that form the resonant tank 102, and the target voltage range for the LED load 110. In general, the first fixed switching frequency Fsw1 is a constant frequency which can support constant current over a defined voltage range and the second fixed switching frequency Fsw2 is a higher frequency that cannot provide constant current behavior over the defined voltage range but is used to transfer energy during high dimming conditions. The first and second fixed switching frequencies Fsw1, Fsw2 may be determined by characterization/simulation to identify the two frequencies that yield the desired behavior under various dimming conditions.

Figure 5:
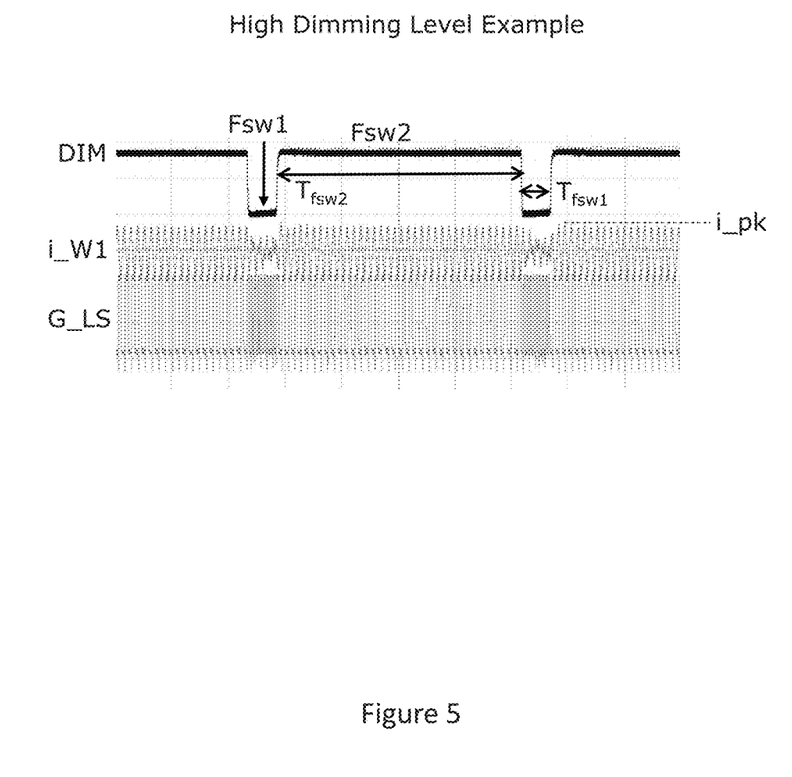
FIGS. 5 and 6 both plot resonant inductor current and switch control waveforms associated with the operation of the open-loop resonate converter shown in FIGS. 1 and 2 in response to a dimming control signal, for different dimming levels.
Figure 6:
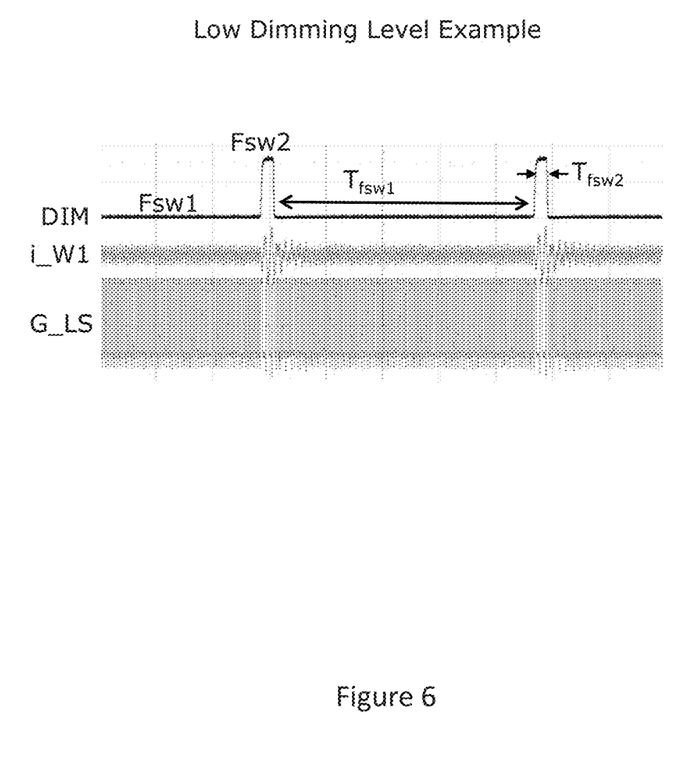

FIGS. 5 and 6 both plot the primary side resonate inductor current i_W1 and the gate signal G_LS generated by the control circuit 112 for switching the low-side switch device Q2 of the switch network 104, in response to the dimming control signal 'DIM' input to the control circuit 112 of the open-loop resonate converter 100. FIG. 5 shows a high dimming level example in which the resonant tank 102 is switched mostly at the second (higher) fixed switching frequency Fsw2, whereas FIG. 6 shows a low dimming level example in which the resonant tank 102 is switched mostly at the first (lower) fixed switching frequency Fsw1. Whether the open-loop resonate converter 100 operates at a higher dimming level (e.g. FIG. 5) or at a lower dimming level (e.g. FIG. 6), the resonate inductor L of the resonant tank 102 has a peak current i_pk during the low frequency (Fsw1) state. Also, the LED current is controlled by the duty cycle of Tfsw1/(Tfsw1+Tfsw2) where Tfsw1 is the period of resonant tank switching at the first fixed switching frequency Fsw1 and Tfsw2 is the period of resonant tank switching at the second fixed switching frequency Fsw2. Switching at the first fixed switching frequency Fsw1 ensures a constant LED current is provided over a defined voltage range at the secondary side of the open-loop resonate converter 100 without feedback from the secondary side. Switching at the second fixed switching frequency Fsw2 ensures adequate energy is transferred to maintain a minimum voltage V_min at the auxiliary winding AUX of the transformer Tr which is sufficient to power the control circuit 112.

Figure 7:
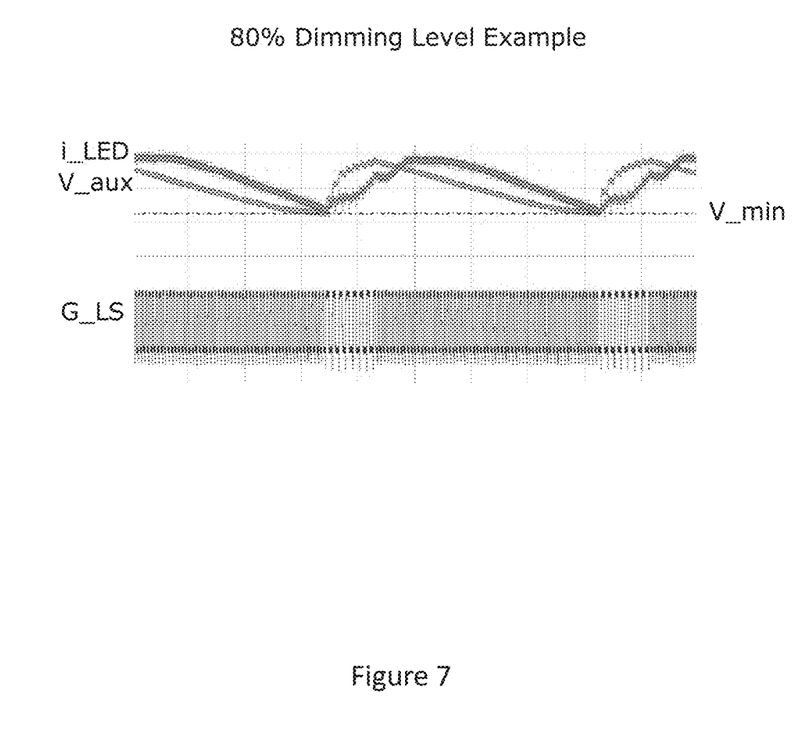
FIGS. 7 and 8 both plot auxiliary winding voltage, LED current and switch control waveforms associated with the operation of the open-loop resonate converter shown in FIGS. 1 and 2, for different dimming levels.
Figure 8:
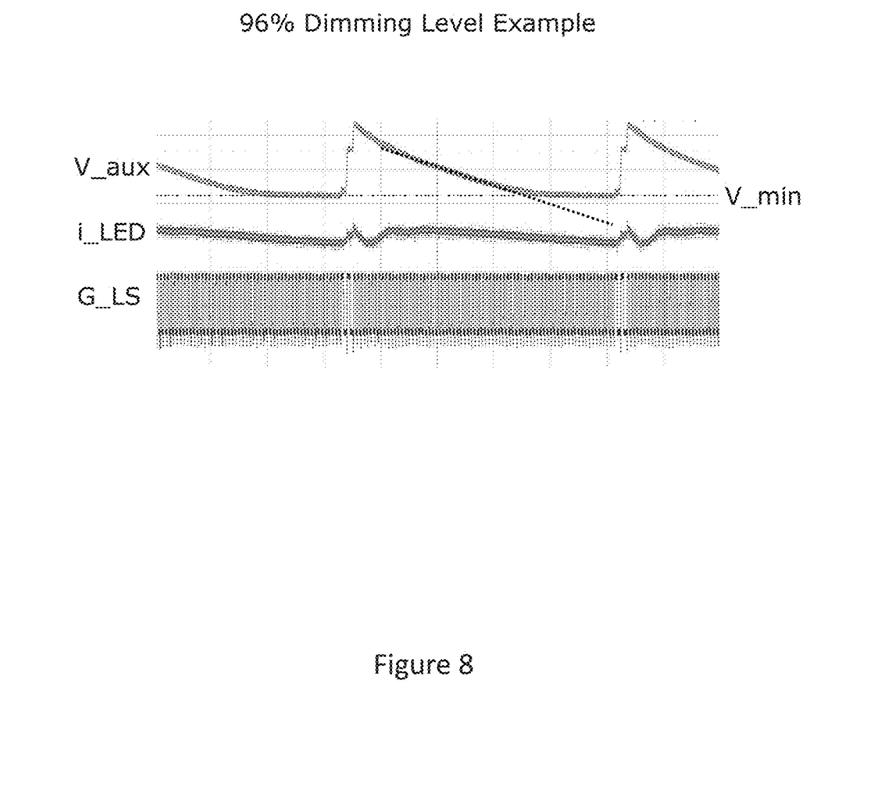

FIGS. 7 and 8 both plot LED current i_LED, the gate signal G_LS generated by the control circuit 112 for switching the low-side switch device Q2 of the switch network 104, and the voltage V_aux across the auxiliary winding AUX of the transformer Tr for two different dimming level examples. FIG. 7 shows a dimming level example of 80%, whereas FIG. 8 shows a dimming level example of 96%. Hence, more dimming is provided in the case of FIG. 8. As shown in FIG. 8, the resonant tank 102 maintains a minimum voltage V_min at the auxiliary winding AUX for powering the controller 112 when switching the resonant tank 102 at the second fixed frequency Fsw2 even for dimming of 96% or greater. For such high dimming levels, very little active switching occurs in conventional PWM dimming and thus the auxiliary winding voltage V_aux drops below the minimum voltage V_min needed to reliably power the controller 112 in the conventional PWM dimming case. The auxiliary winding voltage V_aux under conventional PWM dimming is indicated by the sloped dotted line in FIG. 8.

According to the embodiments described herein, continued switching of the resonant tank 102 is provided under all dimming conditions with PFM control between Fsw1 and Fsw2 based on the duty cycle of the dimming control signal DIM input to the controller 112 of the open-loop resonate converter 100. This way, the controller 112 remains adequately powered under a wider range of dimming conditions as compared to conventional PWM dimming. In the example illustrated in FIG. 8, the simulated open-loop resonate converter 100 maintained a minimum voltage V_min of 20V across the auxiliary winding AUX of the transformer Tr under extremely high dimming conditions which was sufficient to adequately power the controller 112 in this example, whereas the simulated conventional PWM dimming resulted in a drop of the auxiliary winding voltage V_aux down to 7V under the same dimming conditions and which would not adequately power the controller 112.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An open-loop resonate converter, comprising:
a transformer having a first winding on a primary side of the open-loop resonate converter and a second winding on a secondary side of the open-loop resonate converter;
a resonant tank coupled to the first winding of the transformer and configured, at a first fixed frequency, to provide a constant LED current over a voltage range at the secondary side without feedback from the secondary side; and
a circuit configured to modulate switching of the resonant tank between the first fixed frequency and a second fixed frequency higher than the first fixed frequency based on a dimming control signal input to the circuit, such that the resonant tank is switched at the first fixed frequency for longer durations when the dimming control signal indicates less dimming and for shorter durations when the dimming control signal indicates more dimming.

2. The open-loop resonate converter of claim 1, wherein the circuit is a voltage controlled oscillator (VCO) controller configured to switch the resonant tank at the first fixed frequency or the second fixed frequency at a variable duty cycle, and wherein the VCO controller is configured to change the duty cycle based on a voltage level of a dimming control signal input to a frequency control pin of the VCO controller.

3. The open-loop resonate converter of claim 2, further comprising a coupler configured to convert a PWM (pulse width modulation) signal at the secondary side and which indicates a degree of dimming to a current on the primary side and which is input as the dimming control signal to the frequency control pin of the VCO controller.

4. The open-loop resonate converter of claim 1, wherein the circuit is a current controlled oscillator (CCO) controller configured to switch the resonant tank at the first fixed frequency or the second fixed frequency at a variable duty cycle, and wherein the CCO controller is configured to change the duty cycle based on a current level of a dimming control signal input to a frequency control pin of the CCO controller.

5. The open-loop resonate converter of claim 4, further comprising a coupler configured to convert a PWM (pulse width modulation) signal at the secondary side and which indicates a degree of dimming to a current on the primary side and which is input as the dimming control signal to the frequency control pin of the CCO controller.

6. The open-loop resonate converter of claim 1, wherein the resonant tank is configured to transfer energy to the secondary side when switched at the second fixed frequency but not to provide a constant LED current over the voltage range.

7. The open-loop resonate converter of claim 6, wherein the circuit is a controller powered by an auxiliary winding of the transformer, and wherein the resonant tank is configured to maintain a minimum voltage at the auxiliary winding for powering the controller when switching at the second fixed frequency.

8. The open-loop resonate converter of claim 6, wherein the resonant tank is configured to maintain a minimum voltage across an auxiliary winding of the transformer when switching at the second fixed frequency.

9. The open-loop resonate converter of claim 1, wherein the resonant tank is an LLC tank.

10. The open-loop resonate converter of claim 1, wherein the dimming control signal is a pulse width modulation (PWM) signal, wherein the circuit is configured to switch the resonant tank at the first fixed frequency or the second fixed frequency at a variable duty cycle, and wherein the circuit is configured to change the duty cycle based on the level of the PWM signal.

11. A method of controlling an open-loop resonate converter having a transformer with a first winding on a primary side of the open-loop resonate converter and a second winding on a secondary side of the open-loop resonate converter, and a resonant tank coupled to the first winding of the transformer and configured, at a first fixed frequency, to provide a constant LED current over a voltage range at the secondary side without feedback from the secondary side, the method comprising:
receiving a dimming control signal which indicates a degree of LED dimming; and
switching the resonant tank between the first fixed frequency and a second fixed frequency higher than the first fixed frequency based on the dimming control signal, such that the resonant tank is switched at the first fixed frequency for longer durations when the dimming control signal indicates less dimming and for shorter durations when the dimming control signal indicates more dimming.

12. The method of claim 11, wherein the dimming control signal is input to a frequency control pin of a voltage controlled oscillator (VCO) controller configured to switch the resonant tank at the first fixed frequency or the second fixed frequency at a variable duty cycle, and wherein switching the resonant tank between the first fixed frequency and the second fixed frequency comprises changing the duty cycle of the VCO controller based on a voltage level of the dimming control signal.

13. The method of claim 12, wherein receiving the dimming control signal comprises:
converting a PWM (pulse width modulation) signal at the secondary side and which indicates a degree of dimming to a current on the primary side and which is input as the dimming control signal to the frequency control pin of the VCO controller.

14. The method of claim 11, wherein the dimming control signal is input to a frequency control pin of a current controlled oscillator (CCO) controller configured to switch the resonant tank at the first fixed frequency or the second fixed frequency at a variable duty cycle, and wherein switching the resonant tank between the first fixed frequency and the second fixed frequency comprises changing the duty cycle of the CCO controller based on a current level of the dimming control signal.

15. The method of claim 14, wherein receiving the dimming control signal comprises:
converting a PWM (pulse width modulation) signal at the secondary side and which indicates a degree of dimming to a current on the primary side and which is input as the dimming control signal to the frequency control pin of the CCO controller.

16. The method of claim 11, further comprising:
powering a controller of the open-loop resonate converter by an auxiliary winding of the transformer; and
maintaining a minimum voltage at the auxiliary winding for powering the controller by switching the resonant tank at the second fixed frequency.

17. The method of claim 11, wherein receiving the dimming control signal comprises receiving a pulse width modulation (PWM) signal, and wherein switching the resonant tank between the first fixed frequency and the second fixed frequency based on the dimming control signal comprises switching the resonant tank at the first fixed frequency or the second fixed frequency at a variable duty cycle and changing the duty cycle based on the level of the PWM signal.

18. A controller for an open-loop resonate converter, comprising:
  a frequency control pin; and
  an oscillator circuit configured to oscillate between a first fixed frequency and a second fixed frequency at a duty cycle based on a voltage level or a current level of an LED dimming control signal received at the frequency control pin, such that the oscillator circuit oscillates at the first fixed frequency for longer durations when the LED dimming control signal indicates less dimming and for shorter durations when the LED dimming control signal indicates more dimming, wherein the oscillator circuit is a voltage controlled oscillator (VCO) controller configured to oscillate at the first fixed frequency or the second fixed frequency at a variable duty cycle, and wherein the VCO controller is configured to change the duty cycle based on a voltage level of the LED dimming control signal input to the frequency control pin.

* * * * *